Patented Jan. 15, 1952

2,582,799

UNITED STATES PATENT OFFICE 2,582,799

NOVEL POLYSILOXANE COMPOUND AND METHOD OF PREPARING THE SAME

Robert O. Sauer, Schenectady, N. Y., assignor to General Electric Company, a corporation of New York No Drawing. Application January 22, 1948, Serial No. 3,837

4 Claims. (Cl. 260—448.2)

This invention relates to a novel chemical compound and more particularly is concerned with the compound 2,2,4,4,6,6,8,8-octamethyl-1,5-dioxa-2,4,6,8-tetrasilocane having the formula

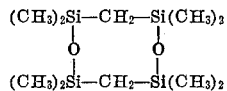

and a method of preparing the same.

The claimed compound has utility as an intermediate in the preparation of other chemical compounds and higher molecular weight materials. This compound is particularly useful in the preparation of higher molecular weight polymeric materials which may be used for lubricating purposes. For example, the compound embraced by my claimed invention may be caused to react with hexamethyldisiloxane in the presence of sulfuric acid in accordance with the procedure disclosed and claimed in Patnode application Serial No. 463,815, filed October 29, 1942, now abandoned, and assigned to the same assignee as the present invention, to yield useful, linear, liquid polymeric compositions of matter having utility as lubricants.

Various methods may be employed for preparing the claimed composition of matter. One method for preparing the above-identified silocane comprises hydrolyzing with an amount of water in excess of that required for complete hydrolysis a compound corresponding to the general formula

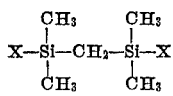

where X is a halogen, e. g., chlorine, bromine, fluorine, etc., and thereafter isolating the claimed silocane from the hydrolysis mass, for example, by fractional distillation. A particular method for preparing the aforementioned halogen-terminated silyl methanes is found in my copending application, Serial No. 3,836, now Patent No. 2,491,833, filed concurrently herewith and assigned to the same assignee as the present invention.

In order that those skilled in the art may better understand how the claimed composition of matter may be prepared, the following example is given by way of illustration.

Example

To an Aminco steel hydrogenation bomb was charged 855 grams trimethylchlorosilane and about 23 parts anhydrous aluminum chloride. The bomb was closed and the mixture heated at 375° C. and 1200 p. s. i. for 7 hours. After cooling the bomb, the liquid contents were fractionally distilled to yield a fraction comprising essentially pure bis-(dimethylchlorosilyl)methane boiling at about 176–177° C. at 754 mm. Analysis of the compound showed it to contain 35.55 per cent chlorine (calculated 35.25 per cent). This compound has the following properties:

$n_D^{20}$ 1.4480
$d_4^{20}$ 1.016
Molar refractivity 53.01 (calculated 53.10)

The isolated bis-(chlorodimethylsilyl)methane was hydrolyzed by pouring it into an amount of water in excess of that required to effect complete hydrolysis of the compound. To the hydrolysis product was added sufficient n-pentane to dissolve the organic material in the hydrolysis mass. The upper organic layer which separated was removed, washed twice with water containing a small amount of neutralizing agent, specifically, $K_2CO_3$, and dried. The n-pentane was removed by evaporation and the residue fractionally distilled to yield 2,2,4,4,6,6,8,8-octamethyl-1,5-dioxa-2,4,6,8-tetrasilocane having a melting point of approximately 30° C. and a boiling point of 213–215° C. This compound has the following additional physical properties:

$n_D^{20}$ 1.4341
$d_4^{20}$ 0.9039
Specific refraction 0.2882 (calc. 0.2888)

Analysis of this compound showed it to comprise the following:

| | Found | Calculated |
|---|---|---|
| Per Cent Carbon | 41.2 | 41.05 |
| Per Cent Hydrogen | 9.7 | 9.58 |

What I claim as new and desire to secure by Letters Patent of the United States is:

1. The method of preparing 2,2,4,4,6,6,8,8-octamethyl-1,5-dioxa-2,4,6,8-tetrasilocane which comprises (1) hydrolyzing with an amount of water in excess of that required for complete hydrolysis a compound corresponding to the general formula

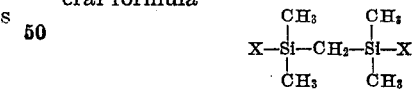

where X is a halogen and (2) isolating the aforementioned silocane.

2. The method of preparing 2,2,4,4,6,6,8,8-octamethyl-1,5-dioxa-2,4,6,8 - tetrasilocane which comprises (1) hydrolyzing bis-(chlorodimethyl-silyl)methane with an amount of water in excess of that required for complete hydrolysis of the latter compound and (2) isolating the aforementioned silocane from the hydrolysis mixture.

3. The method of preparing 2,2,4,4,6,6,8,8-octamethyl-1,5-dioxa-2,4,6,8 - tetrasilocane which comprises (1) hydrolyzing a compound corresponding to the general formula

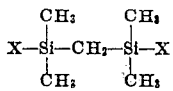

where X is a halogen and (2) isolating the aforementioned silocane.

4. The method of preparing 2,2,4,4,6,6,8,8-octamethyl-1,5-dioxa-2,4,6,8 - tetrasilocane which comprises (1) hydrolyzing bis-(dimethylchlorosilyl)methane and (2) isolating the aforementioned silocane from the hydrolysis mixture.

ROBERT O. SAUER.

REFERENCES CITED

The following references are of record in the file of this patent:

Goodwin: "J. A. C. S.," vol. 69 (1947), page 2247.